United States Patent
Beyer et al.

(10) Patent No.: US 10,846,122 B2
(45) Date of Patent: Nov. 24, 2020

(54) RESOURCE MANAGER INTEGRATION IN CLOUD COMPUTING ENVIRONMENTS

(71) Applicant: Google LLC, Mountain View, CA (US)

(72) Inventors: Ilya Beyer, Mill Valley, CA (US);
Manoj Sharma, Sunnyvale, CA (US);
Gururaj Pangal, Pleasanton, CA (US);
Maurilio Cometto, Redwood City, CA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 16/135,185

(22) Filed: Sep. 19, 2018

(65) Prior Publication Data

US 2020/0089518 A1    Mar. 19, 2020

(51) Int. Cl.
*G06F 9/455* (2018.01)
*G06F 9/50* (2006.01)
*G06F 8/60* (2018.01)

(52) U.S. Cl.
CPC ............ *G06F 9/45558* (2013.01); *G06F 8/60* (2013.01); *G06F 9/5072* (2013.01); *G06F 9/5077* (2013.01); *G06F 2009/45583* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 2014/0013322 A1* | 1/2014 | Freimuth | G06F 8/63 718/1 |
| 2015/0172115 A1* | 6/2015 | Nguyen | H04L 67/10 709/226 |

\* cited by examiner

*Primary Examiner* — Gregory A Kessler
(74) *Attorney, Agent, or Firm* — Honigman LLP; Brett A. Krueger

(57) ABSTRACT

In one embodiment, a system includes first host machines implementing a public-cloud computing environment, wherein at least one of the first host machines comprises a resource manager that provides a public-cloud resource interface through which one or more public-cloud clients interact with one or more virtual machines, and second host machines implementing a private-cloud computing environment, wherein at least one of the second host machines comprises one or more private-cloud virtual machines, wherein at least one of the first host machines further comprises a private-cloud VM resource provider through which the resource manager interacts with the private-cloud virtual machines, wherein the VM resource provider translates requests to perform virtual machine operations from a public-cloud-resource interface to a private-cloud virtual machine interface, and the private-cloud virtual machines perform the requested virtual machine operations in response to receiving the translated requests from the VM resource provider.

19 Claims, 6 Drawing Sheets

RESOURCE MANAGER INTEGRATION IN CLOUD COMPUTING ENVIRONMENTS

TECHNICAL FIELD

This disclosure generally relates to resource management in cloud computing environments.

BACKGROUND

Cloud computing environments may provide access to computing resources such as processors, storage devices, and software as services to client systems via communications networks. Cloud computing environments may provide scalable computing resources, with processor and storage capacity being allocated according to demand and may provide security and privacy to prevent unauthorized access to information. The computing resources may include server computer systems connected via networks, associated data storage devices, and software that implements cloud services, such as infrastructure software for managing cloud resources, and application software that uses cloud resources. Each of the server computer systems may be a node of a network. The cloud's physical resources, such as server computer systems and associated hardware, such as storage devices and network routers, may be located in one or more datacenters. A cloud may thus be said to be hosted by one or more data centers A cloud computing environment may be categorized as a public cloud or a private cloud. A public cloud may provide computing resources to the general public via the public Internet (though communications may be encrypted for information privacy). Examples of public clouds include the Microsoft Azure™ cloud computing service provided by Microsoft Corporation, the Amazon Web Services™ cloud computing service provided by Amazon.com Inc., and the Google Cloud Platform™ cloud computing service provided by Google LLC. A private cloud may provide computing resources to only particular users via a private network or the Internet, e.g., to only users who are members of or associated with a particular organization, and may use resources in a datacenter hosted by, e.g., on the premises of, the particular organization, or resources hosted in a data center at another location, which may be operated by another organization. As an example, a private cloud may be implemented by a public cloud provider by, for example, creating an Internet-accessible private cloud for which access is restricted to only specific users. As another example, a private cloud may be implemented by an organization using private cloud software on hardware resources (e.g., in a datacenter) hosted by the organization itself (or by other organization). The VMware Cloud™ private cloud software, for example, may be used to implement a private cloud.

Cloud computing resources such as computer systems may be provisioned, e.g., allocated, to clients according to requests received from the clients. For example, a client may request access to a specified number of servers with a specified amount of storage and specified operating system and application software. Cloud providers may provision the resources accordingly and may use virtualization techniques to create one or more virtual instances of physical resources such as server computer systems. Each virtual instance may appear, to clients, to be substantially the same as the physical resource, but the virtual instances may be used more efficiently by the cloud provider to fulfill client requests. For example, multiple virtual instances of a physical server may be provided to multiple corresponding users at the same time, and each virtual instance may appear, to its user, to be the same as the physical resource. Virtual instances of a physical server may be created and managed by a hypervisor executing on the physical server. An example hypervisor is the VMware ESXi™ hypervisor provided by VMware Inc. Each virtual instance may be referred to as a virtual machine (VM). An operating system may execute in a virtual machine, and application software may execute in the virtual machine using the operating system.

SUMMARY OF PARTICULAR EMBODIMENTS

In particular embodiments, in a Private-Cloud-as-a-Service (PCAAS) environment, private-cloud resources, such as virtual machines, may be made accessible in public-cloud environments by implementing a resource provider that acts as an interface between a resource manager of the public cloud and the virtual machines of the private cloud. Since private-cloud virtual machines are represented as resources, it is possible to construct PCAAS templates that deploy private-cloud resources via the public cloud. For example, a PCAAS template may specify a deployment that includes public cloud resources such as a compute resource, a storage resource, a database resource, and so on, as well as private cloud resources, such as one or more private-cloud virtual machines. Deploying a single public-cloud template may cause deployment of both the public-cloud and private-cloud resources. Thus, private cloud resources may be grouped, created, and consumed in a PCAAS cloud using public cloud interfaces.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
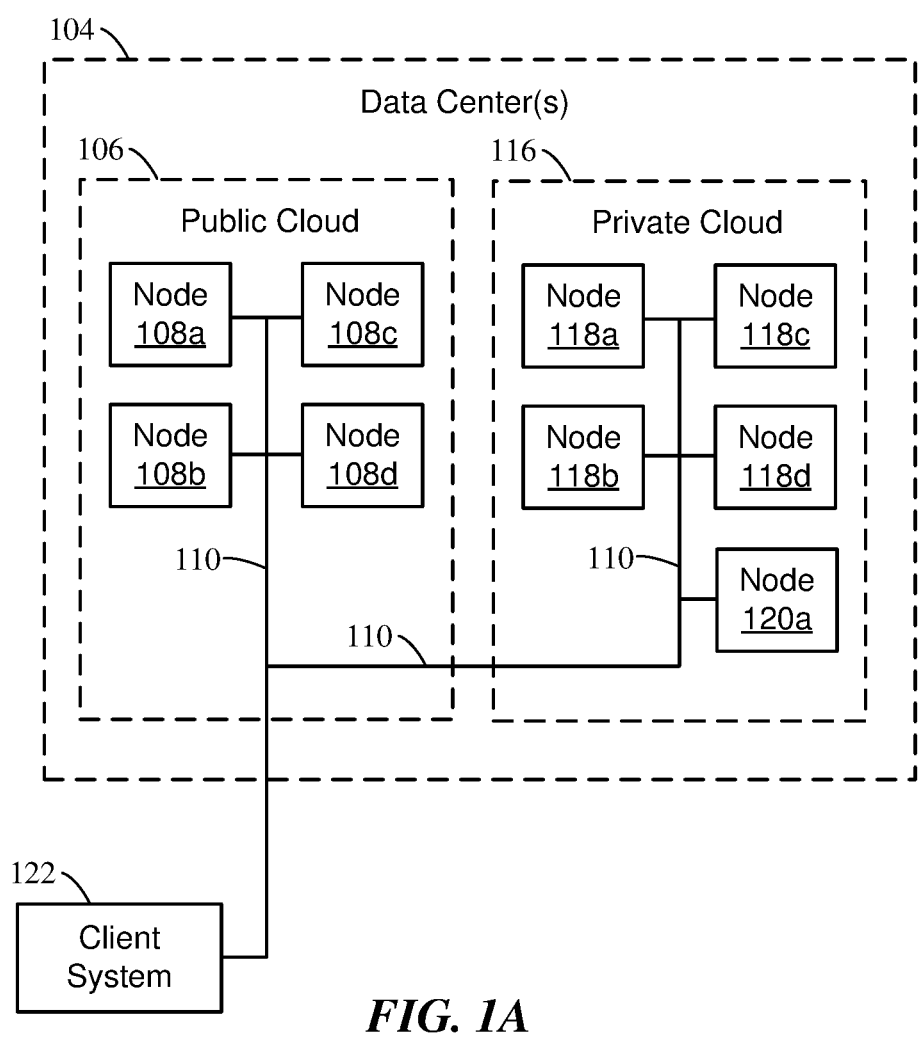
FIG. 1A illustrates an example Private Cloud as a Service (PCAAS) computing environment.

FIG. 1A illustrates an example Private Cloud as a Service (PCAAS) computing environment 100. PCAAS 100 may include a public cloud 106, a private cloud 116, and a client system 122. Public cloud 106 may be hosted in one or more data centers 104. The PCAAS computing environment 100 may provide for sharing of resources, such as application and data, between the public cloud 106 and the private cloud 116. Private cloud 116 may also be hosted in one or more data centers 104, which may be the same as or different as the data center(s) 104 in which public cloud 106 is hosted. Public cloud 106 includes server nodes 108a-d and may be, e.g., Microsoft Azure™ or the like. Private cloud 116 includes server nodes 118a-d and management server node 120a. The server nodes 108 of the public cloud 106 may be hosted in one or more data centers that are different from one or more data centers in which the server nodes 118 of the private cloud 116 are hosted. Alternatively, one or more server nodes 108 of the public cloud 106 may be hosted in the same data center as one or more server nodes 118 of the private cloud 116. Server nodes 108, 118, and 120 may be computer systems connected to each other by a network 110. Each of the server nodes 108, 118, 120 may have at least one processing unit, and may also have one or more storage devices, such as a disk drive, flash storage drive, or the like. Private cloud 116 may be, e.g., VMware Cloud™ or the like. Each of the server nodes 108, 118, 120 may execute a hypervisor such as the VMware ESXi™ hypervisor, the Microsoft Hyper-V™ hypervisor, or other suitable hypervisor. Each of the server nodes 108, 118 may use the hypervisor to execute virtual machines (VMs), operating systems, and software applications. Management node 120a in private cloud 116 may provide management services for the private cloud 116, e.g., resource management, VM management, VM deployment, task scheduling, statistics and logging, and server node management. Software that provides the management services may execute on management node 120a. The management services on management node 120a may be provided by the VMware vCenter Server® management platform, for example.

Although FIG. 1A illustrates a particular arrangement of server nodes in public cloud 106 and private cloud 116, this disclosure contemplates any suitable arrangement of server nodes in public cloud 106 and private cloud 116. This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

The network 110 may include one or more network links. In particular embodiments, one or more links of the network 110 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links. The links need not necessarily be the same throughout PCAAS computing environment 100.

In particular embodiments, client system 122 may be an electronic device including hardware, software, or embedded logic components or a combination of two or more such components and capable of carrying out the appropriate functionalities implemented or supported by client system 122. As an example and not by way of limitation, a client system 122 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 122 may enable a network user at client system 122 to access network 110. A client system 122 may enable its user to communicate with other users at other client systems 130.

Figure 1B:
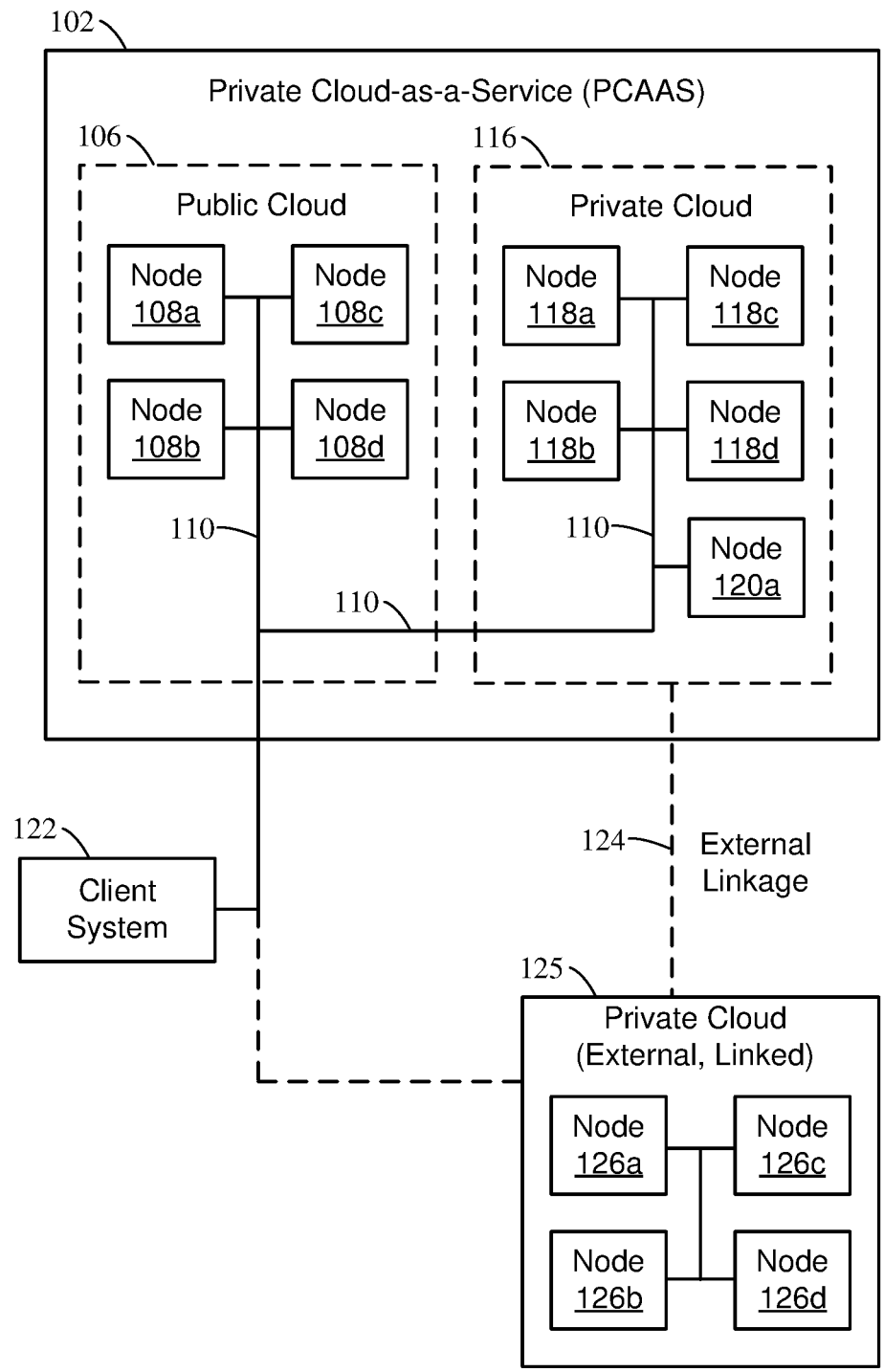
FIG. 1B illustrates an example PCAAS computing environment having connectivity to one or more external private cloud environments.

FIG. 1B illustrates an example PCAAS computing environment 102 having connectivity to one or more external private cloud environments 125. The PCAAS computing environment 102 may include or be associated with a public cloud 106 and a private cloud 116, and may provide networking and management connectivity with one or more external private cloud environments 125 that are not hosted by the provider of the PCAAS computing environment 102. This connectivity with external private cloud environments 125 may be provided by a "linked mode" of the PCAAS computing environment 102 via an external linkage 124. In linked mode, user accounts and credentials from external private cloud environments 125 may be used to authenticate users with the PCAAS private cloud 116 without requiring corresponding accounts and credentials to be explicitly created in the PCAAS private cloud 116. Further, a single (e.g., common) interface provided by (e.g., served by) management components on the external private cloud and/or on the PCAAS private cloud may be used to manage the external private cloud environments and the PCAAS private cloud. The interface may be a user interface (e.g., a management portal interface), an application programming interface, a service-oriented interface, or the like. The external private cloud environment 125 may be, for example, a private cloud running in a customer-controlled environment, a PCAAS private cloud at the same location as the private cloud 116, or at a different location from the private cloud 116, or a private cloud running in a management-provider-controlled environment, which may be created and operated exclusively for a single consumer organization.

Figure 2:
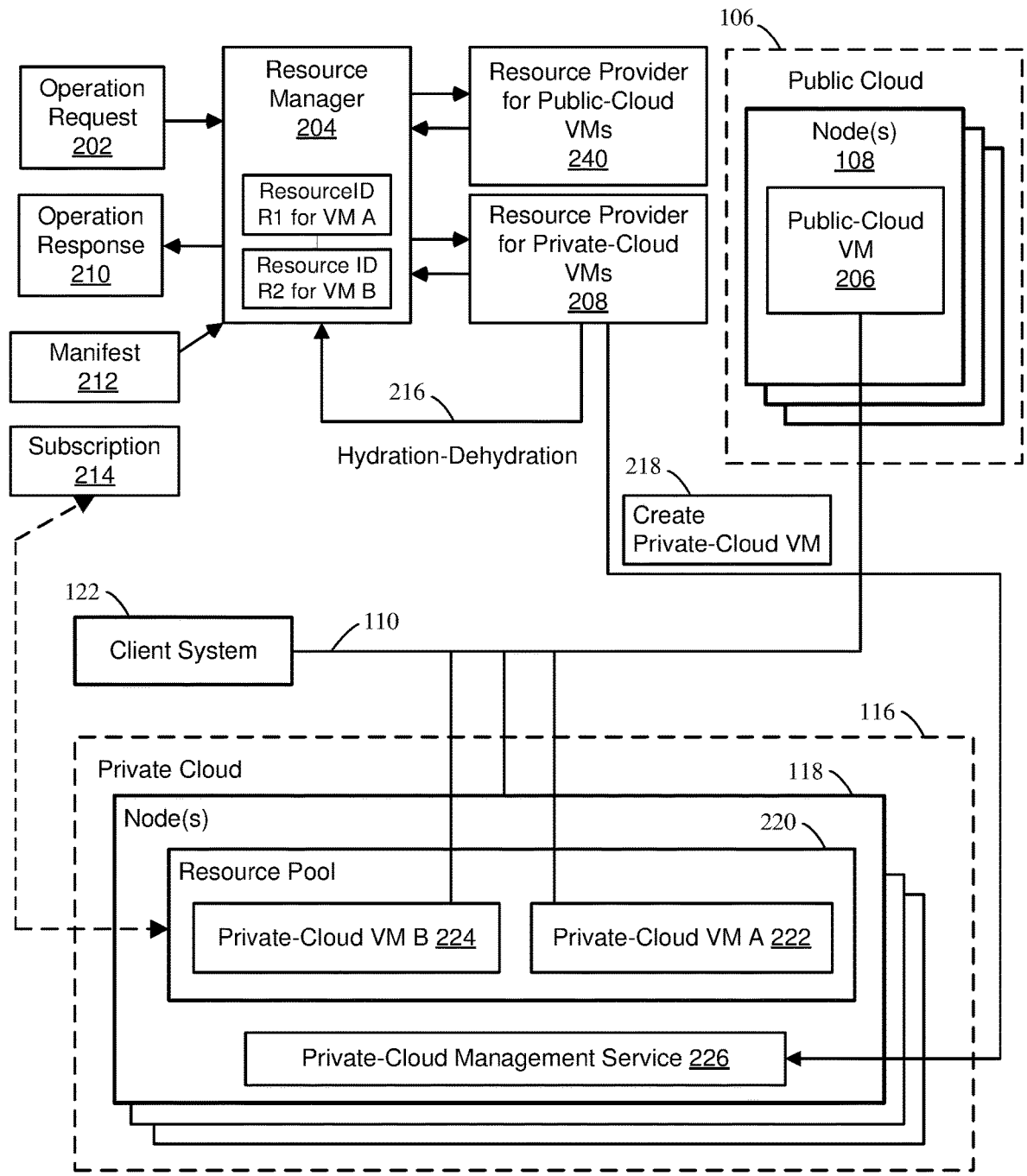
FIG. 2 illustrates a public-cloud resource manager that manages private-cloud virtual machines using a private-cloud VM resource provider.

FIG. 2 illustrates a public-cloud resource manager 204 that manages private-cloud virtual machines (VMs) 222, 224 by managing the private-cloud virtual machines using a private-cloud VM resource provider 208. The resource provider 208 may provide an interface between the resource manager 204 and the private-cloud VMs. That is, control of the private-cloud VMs 222, 224 running in a private cloud 116 may be exposed through the resource provider 208 in the public cloud 106. The private-cloud VMs 222, 224 may be provided by, for example, the VMware ESXi™ hypervisor or the like. The public cloud 106 may be, e.g., the Microsoft Azure™ public cloud, or the like.

In particular embodiments, the resource manager 204 may manage one or more public-cloud VMs 206 using a public-cloud VM resource provider 240. The resource manager 204 may manage the lifecycles of cloud resources such as virtual machines (VMs), network adapters, databases, disk storage, and so on. Cloud users can interact with the resource manager 204 via a portal or command-line interface or REST API on a client system 122 to perform management operations such as deploying, updating, or deleting resources or groups of resources. Requests to perform such operations may be sent to the resource manager 204 as operation requests 202. The resource manager 204 may perform the requested operations as described below, and send operation responses 210 that correspond to the operation requests 202. The operation responses 210 may include the results of the requested operations. Users may define templates that specify groups of resources to be deployed. The resource manager 204 may interact with the resources via intermediary resource providers, which may be implemented by the public-cloud provider or by third parties.

A resource provider may perform lifecycle management for cloud resources. An example resource provider in the Microsoft Azure™ public cloud is Microsoft Compute, which is responsible for lifecycle management of virtual machines 206. Each resource provider may implement the lifecycle operations, e.g., create, delete, reconfigure, expand, shutdown, suspend, and so on, that are appropriate for the cloud resources it manages. Resource providers may be endpoints visible on the Internet, secured by digital certificates. Each resource provider may be described by an associated manifest.

In particular embodiments, the private-cloud VM resource provider 208 may perform lifecycle management for private-cloud virtual machines (VMs) 222, 224 located on one or more nodes 118 of the private cloud 116. The private-cloud VMs 222, 224 may be members of a resource pool 220. A resource pool may limit resource usage across a cluster of VMs by users according to usage limits (e.g., CPU usage limits). The resource provider 208 may be associated with a manifest 212, which may include a description of the resource provider 208 in a structured format. The manifest 212 may link the resource provider 208 to the resource manager 204. The manifest 212 may describe where the resource provider 208 is located, communication endpoints of the resource provider 208, what methods the resource provider 208 exposes, what type of resources the resource provider 208 exposes, and how to manage those resources. The private-cloud resource provider 208 may implement operations for creating, updating, starting, restarting, stopping, and deleting private-cloud virtual machines 222, 224. In particular embodiments, a user may map their public-cloud subscriptions 214 to their private cloud 116 or to portions of it, such as cluster(s) and/or resource pool(s).

In particular embodiments, private-cloud VMs 222 may become visible in the public cloud 106 control plane as a result of being created by the resource manager 204. A resource identifier may be generated for each private-cloud VM. In this example, a resource identifier R1 is generated for the private cloud VM A 222 by the resource manager 204.

In particular embodiments, private-cloud VMs 224 created independently of the public cloud 106 may become available for use in the public cloud 106. As an example, a user may create a new private-cloud VM A 222 in the user's public cloud 106 by clicking a Create button in the public cloud 106's portal. An operation to create a VM may then be propagated to the resource manager 204, which may call the private-cloud VM resource provider 208 to create and provision a VM A 222 inside a specific private-cloud resource pool 220.

In particular embodiments, private-cloud VMs 224 may be created by the private-cloud management service 226. The private-cloud VM resource provider 208 may maintain a list of private-cloud VMs that are currently exposed into the public cloud. These may be listed in a cache maintained by the resource manager 204. A resource manager may expose an endpoint through which a resource provider can perform hydration and dehydration calls—216. The resource provider 208 may periodically scan the private cloud 116 to identify private-cloud VMs 224 that may have been created independently of the public cloud 106. When a new VM, e.g., VM B 224, is identified, the resource provider 204 may call a hydrate operation for VM B 224, thereby making the resource manager 204 aware of VM B 224.

In particular embodiments, a resource provider deployment template may specify a deployable group of cloud resources. For example, a template may specify a group that represents an application and includes the following resources: a compute resource (e.g., a VM), a storage resource, a database resource, a load balancer resource, an application, and so on. The template may group configuration and deployment of the resources and may subsequently be used to deploy the application. Since private-cloud virtual machines 222 are represented as resources, it is possible to construct PCAAS templates that deploy private-cloud resources via a public cloud resource manager using a deployment template. For example, the template may specify a deployment that includes public cloud resources such as a compute resource, a storage resource, a database resource, and so on, as well as private cloud resources, such as one or more private-cloud virtual machines 222. Deploying a single public-cloud template may cause deployment of both the public-cloud and private-cloud resources. Thus, private cloud resources may be grouped, created, and consumed in a PCAAS cloud using public cloud interfaces. The private cloud resources (e.g., private-cloud virtual machines 222) may communicate with the public cloud resources (e.g., public-cloud virtual machines 206) via a data path that uses the network 110. The deployment coexistence is controlled through the templates, which may correspond to a control plane.

In particular embodiments, each cloud resource may have an associated resource identifier. The resource identifier may include information such as provider identifier, a resource type, and a name of the resource, among other information. Example resource identifiers shown in the resource manager 204 include a resource identifier R1 for private cloud VM A 222 and a resource identifier R2 for private cloud VM B.

In particular embodiments, the resource manager 204 may manage one or more linked virtual machines, which may be located on one or more nodes 126 of an external linked private cloud 125. In particular embodiments, a PCAAS private cloud 102 may be connected to or communicate with one or more external private clouds 125 via linked mode, which may use an external linkage 124 In this context, the public cloud resource manager (e.g., located in the public cloud 106) may view, create, edit or delete resources (e.g., virtual machines or other resources) from the external private clouds 125. Such resources may be thus managed in addition to the PCAAS private cloud resources. In particular embodiments, PCAAS private cloud resources are not necessarily managed, and in which case the PCAAS private cloud 116 may serve as a proxy to the external private clouds 125.

In particular embodiments, in particular embodiments, a user may create an application deployment that includes resources having presence both in the PCAAS private cloud 116 and the public cloud 106. In the case, when an external private cloud 125 is linked, the application deployment may optionally consist of resources that are present in the external private cloud 125. An example is a 3-tier web application having a web tier that is present in the public cloud 106 (and may be load-balanced and auto-scaled using public cloud capabilities), and having a database tier that is present in the PCAAS private cloud 116 and configured with private cloud capabilities such as clustering, host affinity for licensing, backup, monitoring, disaster recovery, and the like.

In particular embodiments, a resource defined in a PCAAS private cloud 116 or a in a linked private cloud 125 may have functionality defined (a) directly by the core management component of the private cloud, (b) through the presence of add-on, optional management components installed on the private cloud, (c) through the presence of default/native public cloud services and capabilities present in the public cloud, (d) through the presence of add-on components of the public cloud, (e) through the capabilities of the private cloud system itself, or a combination of one or more of those. Respective examples include (a) CPU or memory usage limits on VMs enabled by vCenter, (b) backup policies and schedules enabled on VMs by add-on backup tools, (c) features to ETL data from database VMs using the Azure Data Factory service, (d) features to create intrusion detection or intrusion prevention (IDS/IPS) on a VM's traffic through an add-on security appliance deployed in Azure, and (e) the private cloud system may enable capabilities on private cloud VMs in a private cloud 116, such as private network security groups, public IP addresses, route tables, and the like.

In particular embodiments, PCAAS private cloud resources or linked private cloud resources may be managed remotely. A user may view, enable, disable, or change such functionality on such resources through the use of a public cloud resource manager. As an example of management functionality supported by the public cloud resource manager, connections may be established to the operating system inside a virtual machine (VM) of the private cloud. Such connections may be made, for example, via remote desktop connections to a Microsoft Windows VM, or a VNC or SSH connection to a Linux VM. Such connections may be enabled via a remote or web connection system of the hypervisor that allows connecting to the console or "desktop" view of a Virtual Machine. The resource manager may allow such connections to such interfaces of resources in a PCAAS private cloud 116 or in a linked private cloud 125.

Figure 3:
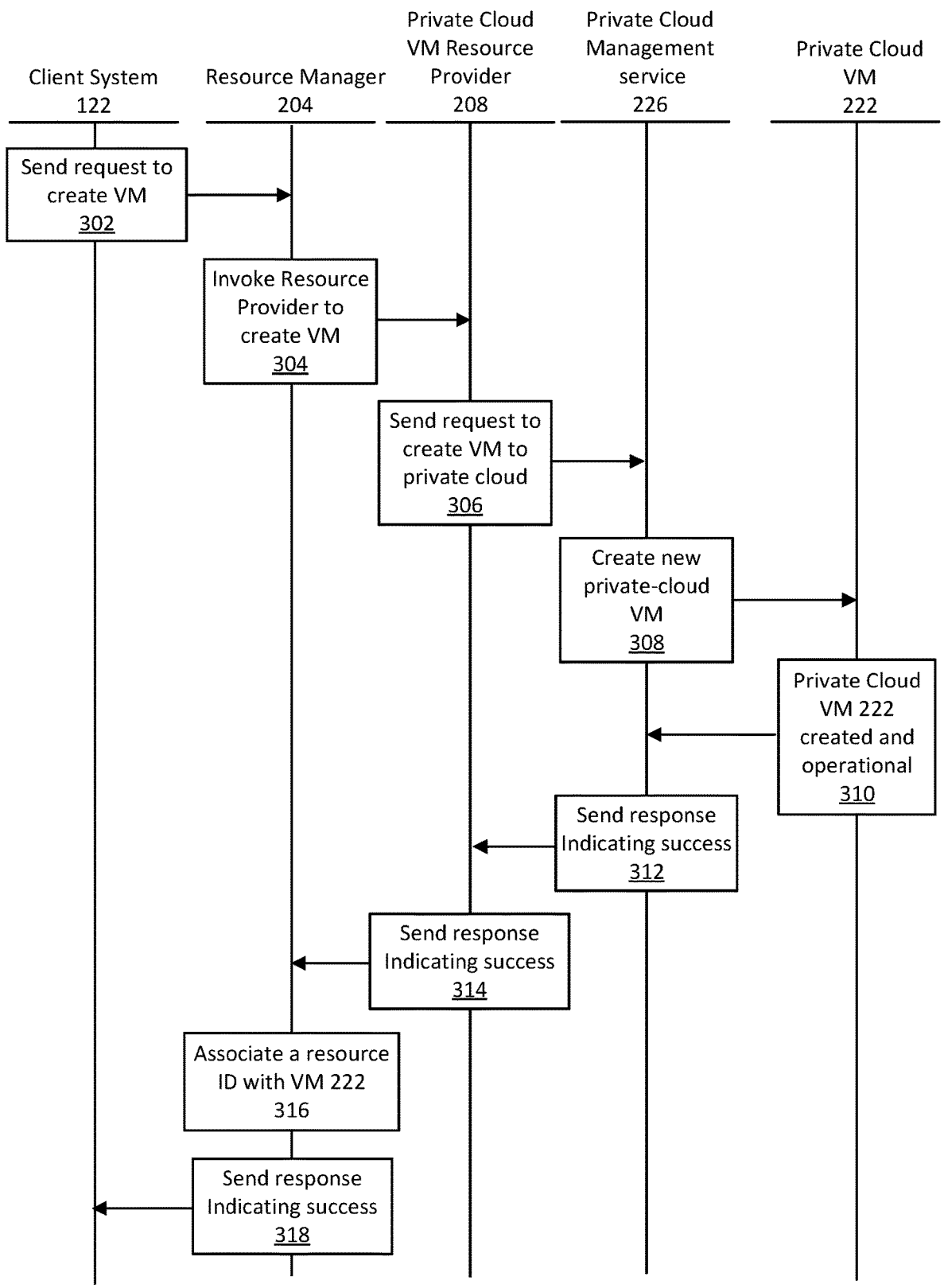
FIG. 3 illustrates example interactions that may occur when a public-cloud resource manager initiates creation of a private-cloud virtual machine.

FIG. 3 illustrates example interactions that may occur when a public-cloud resource manager 204 initiates creation of a private-cloud virtual machine 222. At block 302, client system 122 sends a request to create a private-cloud VM to resource manager 204. At block 304, resource manager 204 receives the request from the client system 122 and, in response to the request, invokes a private cloud VM resource provider 208 to create a private cloud VM 222. At block 306, in response to being invoked by the resource manager 204, the private cloud VM resource provider may send a request 218 to create a VM to a private cloud management service 226.

At block 308, the private cloud management service 226 may, in response to receiving the request to create a VM, create a new private-cloud VM 222 with specified parameters, such as a specified image file. At block 310, the new private-cloud VM 222 may be operational using the specified image file. Block 310 may send a response to the private cloud management service 226 indicating that the private-cloud VM 222 has been created successfully. The private-cloud management service 226 may receive the response at block 312 and send a response to the private-cloud VM resource provider 208 indicating success. Block 314 may then send a success indication to the resource manager 204. The resource manager 204 may associate a resource identifier, e.g., resource identifier R1, with the newly-created private-cloud VM 222 at block 316 and send a success indication to the client system 122 at block 318. Block 318 may return results that indicate the operation completed or was accepted but may be completed at a later time. Acceptance of the operation may imply that subsequent requests may need to be made from the client to determine when the operation completes.

Figure 4:
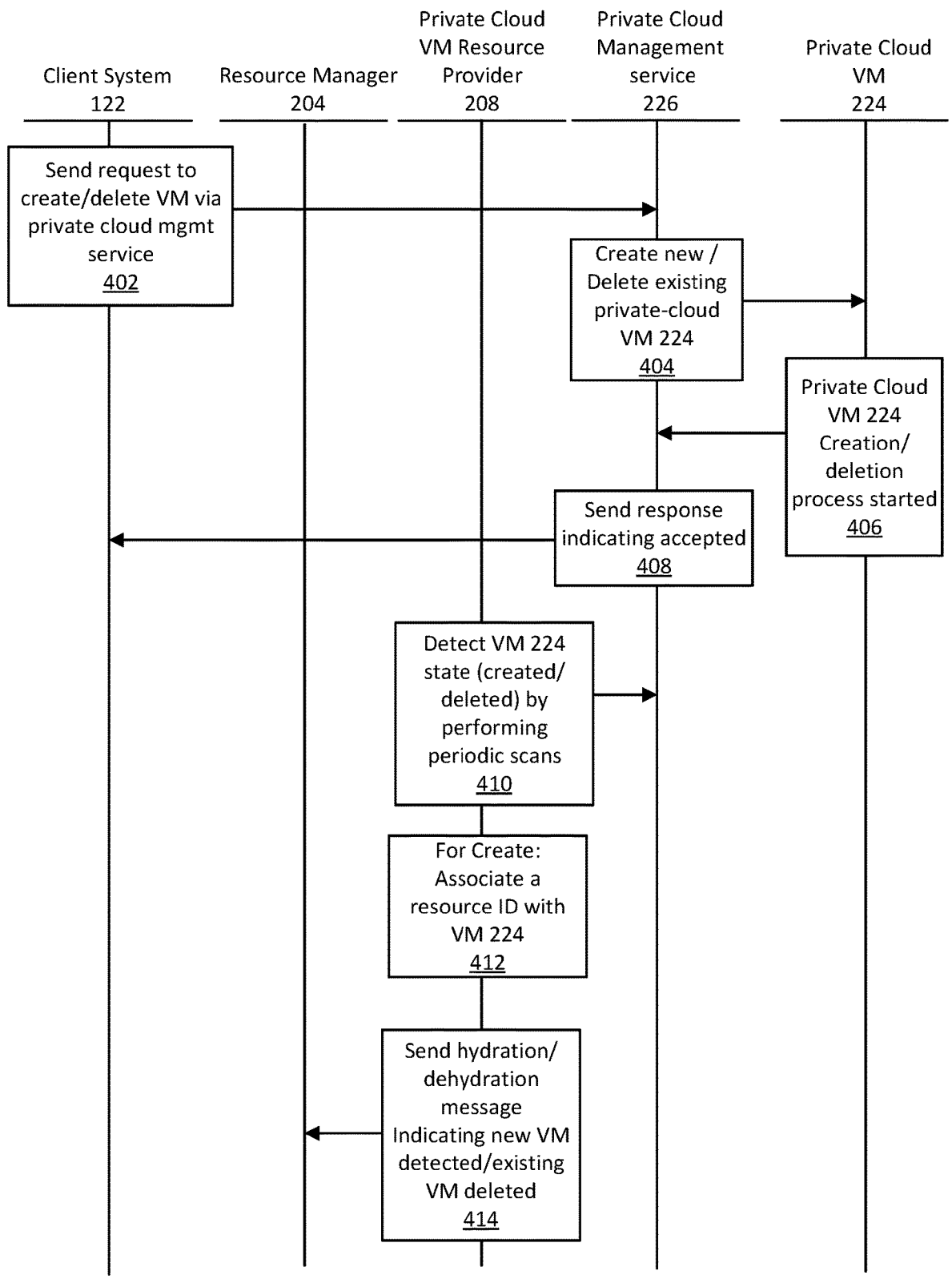
FIG. 4 illustrates example interactions that may occur when a private cloud-management service creates or deletes a private-cloud virtual machine that is accessible in a public cloud via a resource manager.

FIG. 4 illustrates example interactions that may occur when a private cloud-management service 226 creates or deletes a private-cloud virtual machine 224 that is accessible in a public cloud 106 via a resource manager 204. Differences between the interactions used to create a private-cloud VM 224 and the interactions used to delete a private-cloud VM 224 are described below. At block 402, the client system 122 may send a request to create (or delete) a VM to the private cloud management service 226. The request may include parameters, which may indicate whether a VM is to be created or a specified VM is to be deleted. At block 404, if the request is to create a VM, the private cloud management service 226 may create a new private-cloud VM 224 with the specified parameters, such as a specified image file. If the request is to delete a VM, the private cloud management service 226 may delete the specified existing private-cloud VM 224. New private-cloud VM 224 may be operational using the specified image file. At block 406, a creation process may be performed to create the new private-cloud VM 224. Alternatively, if the request is to delete a private-cloud VM 224, a corresponding deletion process may be started at block 406. Block 406 may send a response to the private cloud management service 226 indicating that the requested creation or deletion process has started (e.g., asynchronously). Alternatively, the private-cloud VM 224 may have been created successfully at block 406 (e.g., synchronously). At block 408, the private cloud management service 226 may send a response to the client system 122. The response may indicate that the creation or deletion request has been accepted (e.g., in the asynchronous example), or that the creation or deletion request has been completed successfully (e.g., in the synchronous example). At block 410, the Private Cloud VM Resource Provider 208 may detect the existence of the VM 224 by performing periodic inventory scan of the Private Cloud Management service 226. Block 410 may be optional in the synchronous example. At block 412, if the request was to create a VM, the Private Cloud VM Resource Provider 208 may associate a resource identifier, e.g., resource identifier R2, with the newly-created private-cloud VM 224. At block 414, if the request was to create a VM, the Private Cloud VM Resource Provider 208 may send a hydration message to the resource manager 204 indicating the new VM has been detected. Alternatively, if the request was to delete a VM, the Private Cloud VM Resource Provider 208 may send a dehydration message to the resource manager indicating the existing VM has been deleted.

Figure 5:
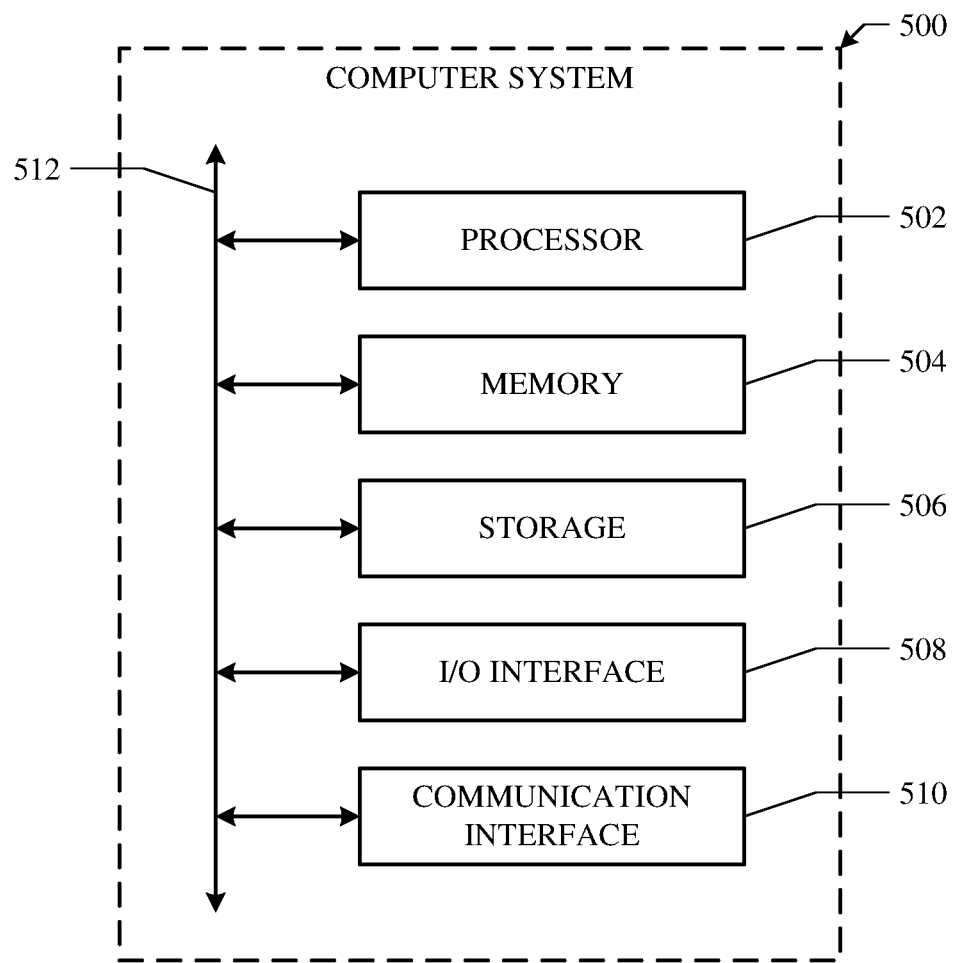
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
a plurality of first host machines implementing a public-cloud computing environment, wherein a resource manager provides a public-cloud resource interface through which one or more public-cloud clients interact with one or more virtual machines; and
a plurality of second host machines implementing a private-cloud computing environment, wherein at least one of the second host machines comprises one or more private-cloud virtual machines,
wherein at least one of the first host machines further comprises a private-cloud VM resource provider through which the resource manager interacts with the private-cloud virtual machines, wherein the private-cloud VM resource provider translates requests to perform virtual machine management operations from a public-cloud-resource interface to a private-cloud virtual machine interface, and the private-cloud virtual machines perform the requested virtual machine operations in response to receiving the translated requests from the private-cloud VM resource provider, and
wherein the resource manager uses the private-cloud VM resource provider to translate responses generated by a private-cloud management service to responses in the public-cloud resource interface.

2. The system of claim 1, wherein the private-cloud virtual machines are accessible in the public-cloud environment via corresponding public-cloud resource identifiers.

3. The system of claim 2, wherein at least one of the first host machines comprises one or more public-cloud virtual machines, and each private-cloud virtual machine is associated with a corresponding public-cloud resource identifier in the public-cloud virtual machines.

4. A system comprising:
a plurality of first host machines implementing a public-cloud computing environment, wherein a resource manager provides a public-cloud resource interface through which one or more public-cloud clients interact with one or more virtual machines; and
a plurality of second host machines implementing a private-cloud computing environment, wherein at least one of the second host machines comprises one or more private-cloud virtual machines, the one or more private-cloud virtual machines accessible in the public-cloud environment via corresponding public-cloud resource identifiers,
wherein at least one of the first host machines further comprises a private-cloud VM resource provider through which the resource manager interacts with the private-cloud virtual machines, wherein the private-cloud VM resource provider translates requests to perform virtual machine management operations from a public-cloud-resource interface to a private-cloud virtual machine interface, and the private-cloud virtual machines perform the requested virtual machine operations in response to receiving the translated requests from the private-cloud VM resource provider,
wherein the requests to perform virtual machine operations comprise a request to create a private-cloud virtual machine, the private-cloud VM resource provider provisions the private-cloud virtual machine in a private-cloud resource pool in response to the request to create the private-cloud virtual machine, and establishes an association between a public-cloud resource identifier and the private-cloud virtual machine, and
wherein the resource pool is associated with a public-cloud subscription.

5. A system comprising:
a plurality of first host machines implementing a public-cloud computing environment, wherein a resource manager provides a public-cloud resource interface through which one or more public-cloud clients interact with one or more virtual machines; and
a plurality of second host machines implementing a private-cloud computing environment, wherein at least one of the second host machines comprises one or more private-cloud virtual machines, the one or more private-cloud virtual machines accessible in the public-cloud environment via corresponding public-cloud resource identifiers,
wherein at least one of the first host machines further comprises a private-cloud VM resource provider through which the resource manager interacts with the private-cloud virtual machines, wherein the private-cloud VM resource provider translates requests to perform virtual machine management operations from a public-cloud-resource interface to a private-cloud virtual machine interface, and the private-cloud virtual machines perform the requested virtual machine operations in response to receiving the translated requests from the private-cloud VM resource provider, and
wherein the private-cloud VM resource provider invokes a hydrate operation for each existing private-cloud virtual machine, and wherein the private-cloud VM resource provider establishes an association between each existing private-cloud virtual machine and a corresponding public-cloud resource identifier.

6. The system of claim 5, wherein the private-cloud VM resource provider identifies each existing private-cloud virtual machine by scanning a list of existing private-cloud virtual machines for a private-cloud virtual machine that does not have a counterpart public-cloud virtual machine.

7. The system of claim 6, wherein the private-cloud VM resource provider identifies one or more previously-existing private-cloud virtual machines that are non-existent, and wherein the private-cloud VM resource provider invokes a dehydrate operation for each of the previously-existing private-cloud virtual machines.

8. The system of claim 7, wherein the private-cloud VM resource provider identifies one or more previously-existing private-cloud virtual machines by scanning a previously-generated list of private-cloud virtual machines for a private-cloud virtual machine that does not exist.

9. A system comprising:
a plurality of first host machines implementing a public-cloud computing environment, wherein a resource manager provides a public-cloud resource interface through which one or more public-cloud clients interact with one or more virtual machines; and
a plurality of second host machines implementing a private-cloud computing environment, wherein at least one of the second host machines comprises one or more private-cloud virtual machines,
wherein at least one of the first host machines further comprises a private-cloud VM resource provider through which the resource manager interacts with the private-cloud virtual machines, wherein the private-cloud VM resource provider translates requests to perform virtual machine management operations from a public-cloud-resource interface to a private-cloud virtual machine interface, and the private-cloud virtual machines perform the requested virtual machine operations in response to receiving the translated requests from the private-cloud VM resource provider, and wherein the resource manager creates at least one public-cloud virtual machine on at least one of the first host machines and at least one private-cloud virtual machine on at least one of the second host machines in accordance with a deployment template that specifies configuration and deployment information for an application.

10. The system of claim 1, wherein the resource manager manages one or more linked private-cloud virtual machines that are located in an external private-cloud computing environment.

11. The system of claim 10, wherein the resource manager creates, edits, or deletes one or more resources of the external private-cloud computing environment.

12. The system of claim 11, wherein the resources comprise virtual machines.

13. A system comprising:
a plurality of first host machines implementing a public-cloud computing environment, wherein a resource manager provides a public-cloud resource interface through which one or more public-cloud clients interact with one or more virtual machines; and
a plurality of second host machines implementing a private-cloud computing environment, wherein at least one of the second host machines comprises one or more private-cloud virtual machines,
wherein at least one of the first host machines further comprises a private-cloud VM resource provider through which the resource manager interacts with the private-cloud virtual machines, wherein the private-cloud VM resource provider translates requests to perform virtual machine management operations from a public-cloud-resource interface to a private-cloud virtual machine interface, and the private-cloud virtual machines perform the requested virtual machine operations in response to receiving the translated requests from the private-cloud VM resource provider, and
wherein the resource manager creates at least one application deployment that includes one or more resources having presence both in the private-cloud computing environment and the public-cloud computing environment.

14. The system of claim 13, wherein the private-cloud computing environment comprises an external private-cloud computing environment.

15. The system of claim 13, wherein the resources are defined in the private-cloud computing environment or in the public-cloud computing environment.

16. The system of claim 15, wherein the resources are defined:
(a) directly by a core management component of the private-cloud computing environment,
(b) by an add-on management component installed in the private-cloud computing environment,
(c) through one or more public-cloud services present in the public-cloud computing environment,
(d) through one or more add-on components of the public-cloud computing environment,
(e) through one or more capabilities of the private-cloud computing environment, or a combination thereof.

17. The system of claim 13, wherein the resources are managed remotely via the resource manager via network connections.

18. A method comprising:
by one or more first host machines, providing a public-cloud computing environment, wherein a resource manager of the public-cloud computing environment provides a public-cloud resource interface through which one or more public-cloud clients interact with one or more virtual machines;
by one or more second host machines, providing a private-cloud computing environment, wherein at least one of the second host machines comprises one or more private-cloud virtual machines; and
by one or more of the first host machines, translating, by a private-cloud VM resource provider, requests to perform virtual machine management operations from the public-cloud-resource interface to a private-cloud virtual machine interface,
wherein the resource manager interacts with the private-cloud virtual machines through the private-cloud VM resource provider,
wherein the private-cloud virtual machines perform the requested virtual machine operations in response to receiving the translated requests from the private-cloud VM resource provider, and
wherein the resource manager uses the private-cloud VM resource provider to translate responses generated by a private-cloud management service to responses in the public-cloud resource interface.

19. One or more computer-readable non-transitory storage media embodying software that is operable when executed to:
provide a public-cloud computing environment on one or more first host machines, wherein a resource manager of the public-cloud computing environment provides a public-cloud resource interface through which one or more public-cloud clients interact with one or more virtual machines;
provide a private-cloud computing environment on one or more second host machines, wherein at least one of the second host machines comprises one or more private-cloud virtual machines; and
translate, by a private-cloud VM resource provider on one or more of the first host machines, requests to perform virtual machine management operations from the public-cloud-resource interface to a private-cloud virtual machine interface,
wherein the resource manager interacts with the private-cloud virtual machines through the private-cloud VM resource provider,
wherein the private-cloud virtual machines perform the requested virtual machine operations in response to receiving the translated requests from the private-cloud VM resource provider, and wherein the resource manager creates at least one application deployment that includes one or more resources having presence both in the private-cloud computing environment and the public-cloud computing environment.

* * * * *